(12) United States Patent
Hagiwara

(10) Patent No.: US 8,767,239 B2
(45) Date of Patent: Jul. 1, 2014

(54) PRINTING DATA DELIVERY APPARATUS, PRINTING DATA DELIVERY SYSTEM, AND PRINTING APPARATUS

(75) Inventor: Takahiro Hagiwara, Chiba-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 440 days.

(21) Appl. No.: 13/270,316

(22) Filed: Oct. 11, 2011

(65) Prior Publication Data
US 2012/0092713 A1 Apr. 19, 2012

Related U.S. Application Data

(60) Provisional application No. 61/392,712, filed on Oct. 13, 2010.

(51) Int. Cl.
*G06K 15/02* (2006.01)
(52) U.S. Cl.
USPC .................. 358/1.15; 358/1.14; 358/1.13
(58) Field of Classification Search
CPC ... G06F 3/1219; G06F 3/1257; G06F 3/1261; G06F 3/1285; G06F 3/1222; G06F 3/1238; G03G 15/6588; G03G 2215/00666; G03G 2215/00932; H04N 2201/3242; B41J 2/17503
USPC .................................................. 358/1.15, 1.1
See application file for complete search history.

(56) References Cited

U.S. PATENT DOCUMENTS

2010/0259780 A1* 10/2010 Shrader et al. ............... 358/1.15
2013/0250025 A1* 9/2013 Kaneko et al. ................ 347/179

FOREIGN PATENT DOCUMENTS

JP 2005-157558 6/2005

* cited by examiner

*Primary Examiner* — King Poon
*Assistant Examiner* — Iriana Cruz
(74) *Attorney, Agent, or Firm* — Amin, Turocy & Watson, LLP

(57) ABSTRACT

A printing data delivery apparatus includes: a printing-data receiving section configured to receive printing data; a data storing section configured to extract print setting information from the received printing data and store the print setting information; a printing-request receiving section configured to receive a printing job request from a printing apparatus; a reuse determining section configured to perform first determination for determining whether the printing apparatus is an apparatus that performs printing with erasable toner or an apparatus that performs printing with unerasable toner, perform second determination for determining whether the printing data can be printed with the erasable toner, and perform first generation for giving, to the print setting information, information indicating whether it is appropriate to print the printing data in the printing apparatus and generating a printing job; and a printing-data delivery section configured to transmit the printing job to the printing apparatus.

20 Claims, 19 Drawing Sheets

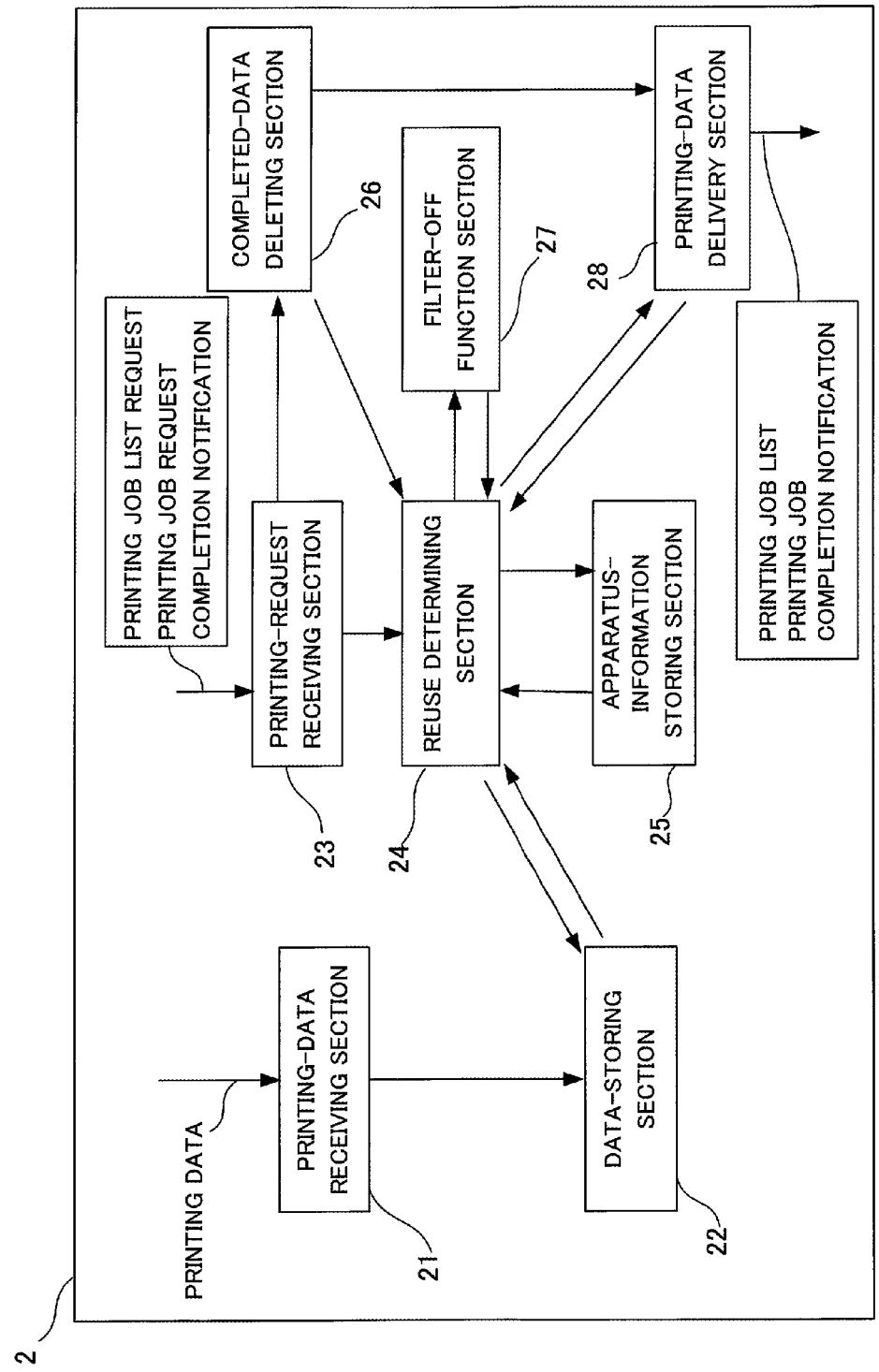

Fig.4

| Job No | PRINTING JOB RECEPTION TIME | USER ID | DEPARTMENT ID | COLOR MODE | DUPLEX MODE | SECURITY PRINTING | STAPLING FUNCTION | HOLE PUNCHING FUNCTION | ... |
|---|---|---|---|---|---|---|---|---|---|
| JOB00001 | 2010/03/03 15:03:43 | USER001 | GROUP01 | FULL COLOR | SIMPLEX | LEVEL1 | TWO PLACES ON LEFT | NONE | ... |
| JOB00002 | 2010/03/03 15:05:03 | USER001 | GROUP01 | FULL COLOR | SIMPLEX | LEVEL1 | NONE | NONE | ... |
| JOB00003 | 2010/03/03 15:06:22 | USER002 | GROUP02 | TWIN COLOR | DUPLEX | LEVEL1 | NONE | NONE | ... |
| JOB00004 | 2010/03/03 15:06:41 | USER003 | GROUP03 | MONOCHROME | DUPLEX | LEVEL1 | UPPER LEFT | NONE | ... |
| JOB00005 | 2010/03/03 15:07:04 | USER001 | GROUP01 | FULL COLOR | SIMPLEX | LEVEL3 | NONE | LEFT | ... |
| JOB00006 | 2010/03/03 15:08:31 | USER004 | GROUP02 | FULL COLOR | SIMPLEX | LEVEL1 | NONE | NONE | ... |
| JOB00007 | 2010/03/03 15:08:33 | USER003 | GROUP03 | FULL COLOR | DUPLEX | LEVEL1 | NONE | NONE | ... |
| JOB00008 | 2010/03/03 15:10:15 | USER005 | GROUP03 | FULL COLOR | SIMPLEX | LEVEL1 | NONE | NONE | ... |
| JOB00009 | 2010/03/03 15:13:40 | USER003 | GROUP03 | MONOCHROME | SIMPLEX | LEVEL1 | UPPER LEFT | NONE | ... |
| JOB00010 | 2010/03/03 15:15:03 | USER005 | GROUP03 | FULL COLOR | SIMPLEX | LEVEL2 | NONE | LEFT | ... |
| JOB00011 | 2010/03/03 15:16:22 | USER004 | GROUP02 | FULL COLOR | SIMPLEX | LEVEL1 | NONE | NONE | ... |
| JOB00012 | 2010/03/03 15:16:41 | USER003 | GROUP03 | MONOCHROME | DUPLEX | LEVEL1 | NONE | NONE | ... |
| ... | ... | ... | ... | ... | ... | ... | ... | ... | ... |

Fig.5

| PRINT SETTING | STAPLING FUNCTION SETTING | HOLE PUNCHING FUNCTION SETTING | N IN 1 PRINTING FUNCTION SETTING | DUPLEX PRINTING FUNCTION SETTING | PLAIN PAPER USING PRINT | REVERSE SIDE PAPER USING PRINT SETTING | REUSE PAPER USE SETTING (LESS THAN FIVE TIMES) | REUSE PAPER USE SETTING (FIVE TIMES OR MORE) | SECURITY LEVEL SETTING |
|---|---|---|---|---|---|---|---|---|---|
| REUSE DETERMINATION CONDITION | NG DURING USE | NG DURING USE | NO NG CONDITION | NO NG CONDITION | NO NG CONDITION | NG DURING USE | NO NG CONDITION | NG DURING USE | NG IN AT LEVEL 3 OR HIGHER |

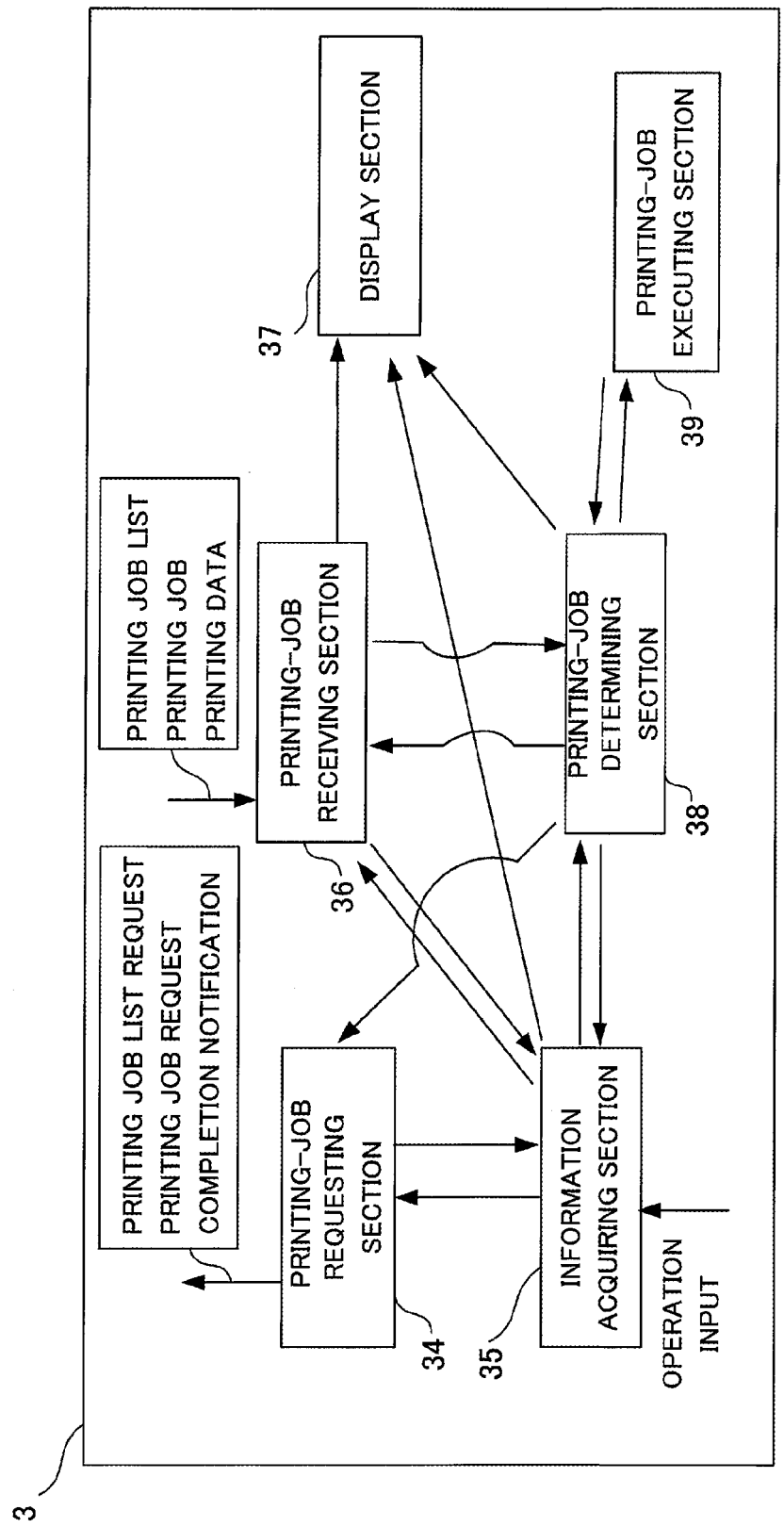

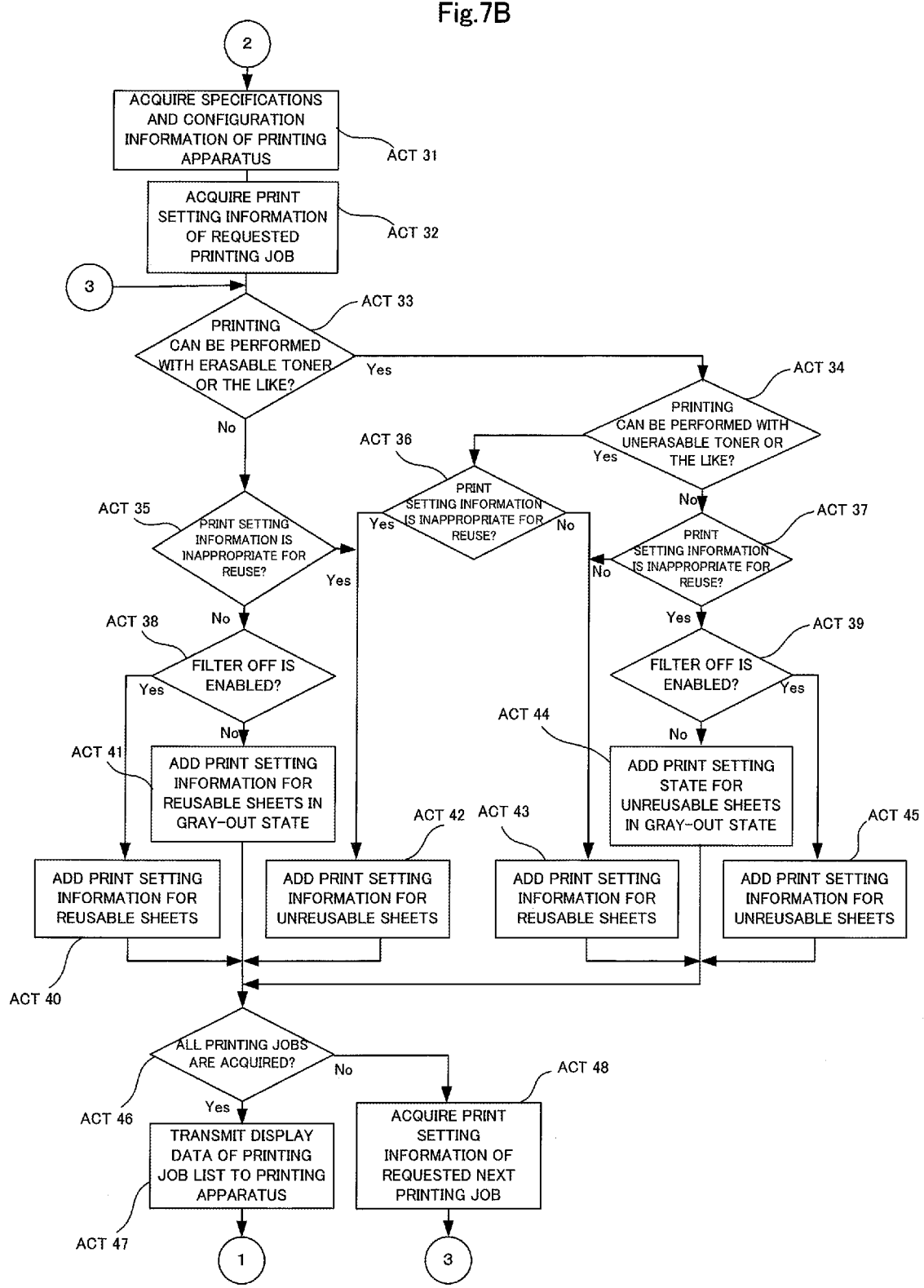

Fig.10

| No | DOCUMENT NAME | RECEPTION DATE AND TIME | PRINT SETTING | REUSABILITY |
|---|---|---|---|---|
| 1 | PRINTING TITLE 10 | 20, 19:05 | | |
| 2 | PRINTING TITLE 9 | 20, 19:01 | | |
| 3 | PRINTING TITLE 8 | 20, 18:55 | | |
| 4 | PRINTING TITLE 7 | 20, 18:54 | | |
| 5 | PRINTING TITLE 6 | 20, 16:33 | | |
| 6 | PRINTING TITLE 5 | 20, 15:05 | | |
| 7 | PRINTING TITLE 4 | 20, 10:36 | | |
| 8 | PRINTING TITLE 3 | 20, 08:51 | | |

LOCATION-FREE PRINTING SYSTEM — USER1
PLEASE SELECT PRINTING JOB

DELETE | CLEAR SELECTION | COLLECTIVE SELECTION | FILTER OFF | PRINT

UPDATE — 307

Fig.11

| No | DOCUMENT NAME | RECEPTION DATE AND TIME | PRINT SETTING | | | REUSABILITY |
|---|---|---|---|---|---|---|
| 1 | PRINTING TITLE 10 | 20, 19:05 | ▨ | 1 | ▤ | ♻ Reuse |
| 2 | PRINTING TITLE 9 | 20, 19:01 | ▨ | 1 | ▤ | |
| 3 | PRINTING TITLE 8 | 20, 18:55 | ☐ | 2 | ▤ | ♻ Reuse |
| 4 | PRINTING TITLE 7 | 20, 18:54 | ☐ | 2 | ▤ | |
| 5 | PRINTING TITLE 6 | 20, 16:33 | ▨ | 1 | ▤ | ♻ Reuse |
| 6 | PRINTING TITLE 5 | 20, 15:05 | ☐ | 2 | ▤ | ♻ Reuse |
| 7 | PRINTING TITLE 4 | 20, 10:36 | ▨ | 1 | ▤ | ♻ Reuse |
| 8 | PRINTING TITLE 3 | 20, 08:51 | ▨ | 1 | ▤ | |

LOCATION-FREE PRINTING SYSTEM — USER1

PLEASE SELECT PRINTING JOB

307

DELETE  CLEAR SELECTION  COLLECTIVE SELECTION  FILTER OFF  PRINT

UPDATE  ◁  ▷

Fig.12

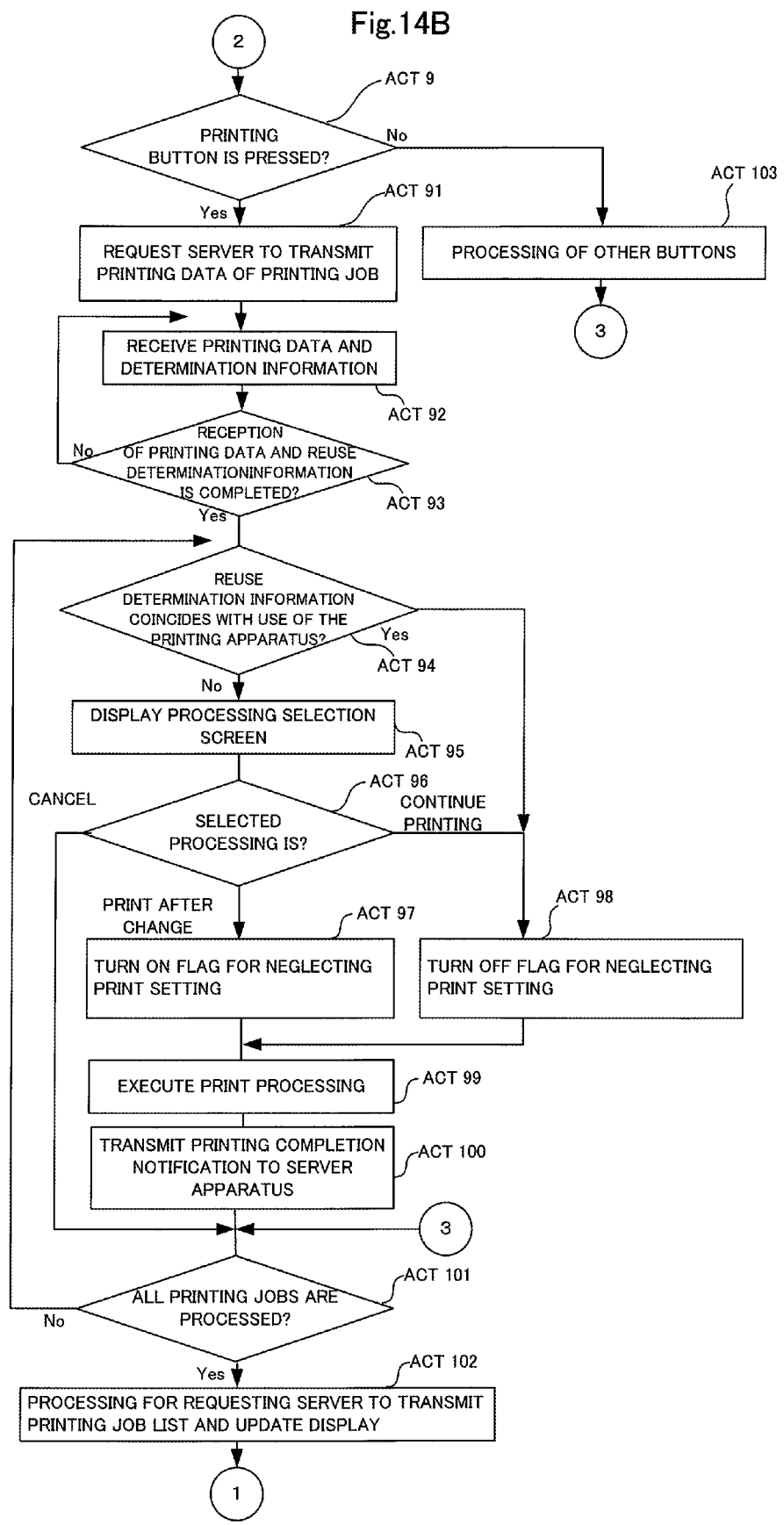

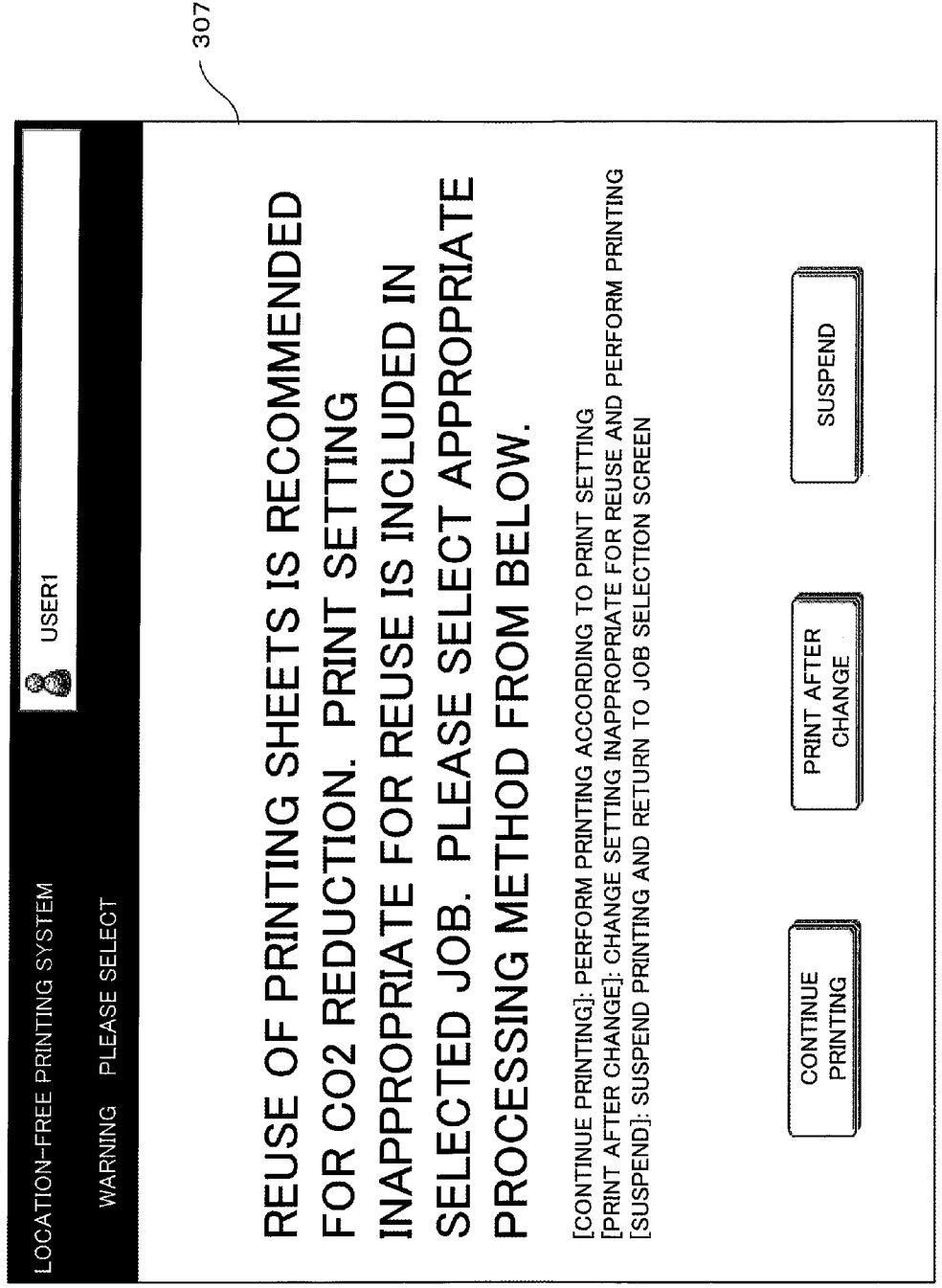

PRINTING DATA DELIVERY APPARATUS, PRINTING DATA DELIVERY SYSTEM, AND PRINTING APPARATUS

CROSS-REFERENCE TO RELATED APPLICATION

This application is based upon and claims the benefit of priority from U.S. provisional application 61/392,712, filed on Oct. 13, 2010; the entire contents of which are incorporated herein by reference.

FIELD

Embodiments described herein relate generally to a technique for facilitating a method of using printing media taking into account efficiency of discarding work for prints printed by a printer or the like and a life cycle of the prints.

BACKGROUND

In the past, when a user discards prints printed by a printer or the like, in order to allow the user to easily perform classification work for the prints, classifications for sorting are printed in margins of the prints.

However, in this related art, a discarding classification is merely determined from information such as a printing ratio (the number of recording dots per one page, a color printing ratio, etc.) and a sheet type (the material and the size of a sheet). Therefore, in this related art, if a format (a printing ratio and a sheet type) of a print is the same, a discarding classification cannot be changed according to a difference in a security level or presence or absence of staples. In other words, if a format of a print is "reusable", a discarding classification "reusable" is affixed to even a print that has a high security level and needs to be shredded and a print that cannot be reused because the print is stapled.

Further, in this related art, since a discarding classification determined on the basis of format setting of a print is simply printed on the print, if a user does not notice print setting inappropriate for reuse of the print, the print could be printed according to wrong print setting. As a result, the print cannot be reused and discarded documents increase.

DESCRIPTION OF THE DRAWINGS

FIG. 3 is a functional block diagram of the printing data delivery apparatus;

FIG. 4 is a diagram of a printing job management table;

FIG. 5 is a diagram of a reusability setting table;

FIG. 6 is a functional block diagram of the printing apparatus;

FIGS. 7A and 7B are control flowcharts of the printing data delivery apparatus;

FIG. 8 is a display diagram of a printing job list in a printing apparatus for reusable sheets;

FIG. 10 is a display diagram of a printing job list in a printing apparatus for unreusable sheets;

FIG. 11 is a display diagram of a printing job list during ON setting of a filter OFF function in the printing apparatus for reusable sheets and the printing apparatus for unreusable sheets;

FIG. 12 is a display diagram of a printing job list during printing job collective selection in the printing apparatus for reusable sheets;

FIGS. 14A and 14B are control flowcharts of the printing apparatus;

FIG. 17 is a display diagram of the control panel displayed when a selected printing job is unsuitable for print setting currently selected by a user in the reuse selectable printing apparatus.

DETAILED DESCRIPTION

In general, according to one embodiment, a printing data delivery apparatus includes: a printing-data receiving section configured to receive printing data transmitted from a client terminal apparatus; a data storing section configured to extract print setting information from the printing data received by the printing-data receiving section and store the print setting information in association with an image in the printing data; a printing-request receiving section configured to receive a printing job request from a printing apparatus; a reuse determining section configured to perform first determination for determining whether the printing apparatus that transmits the printing job request to the printing-request receiving section is an apparatus that performs printing with erasable toner or an apparatus that performs printing with unerasable toner, perform second determination for determining, on the basis of the print setting information stored in the data storing section, whether the printing data can be printed with the erasable toner, and perform first generation for giving, on the basis of determination results of the first determination and the second determination, to the print setting information, information indicating whether it is appropriate to print the printing data in the printing apparatus that transmits the printing job request and generating a printing job; and a printing-data delivery section configured to transmit the printing job generated by the first generation of the reuse determining section to the printing apparatus that transmits the printing job request.

A form of an embodiment is explained in detail below with reference to the accompanying drawings.

Figure 1:
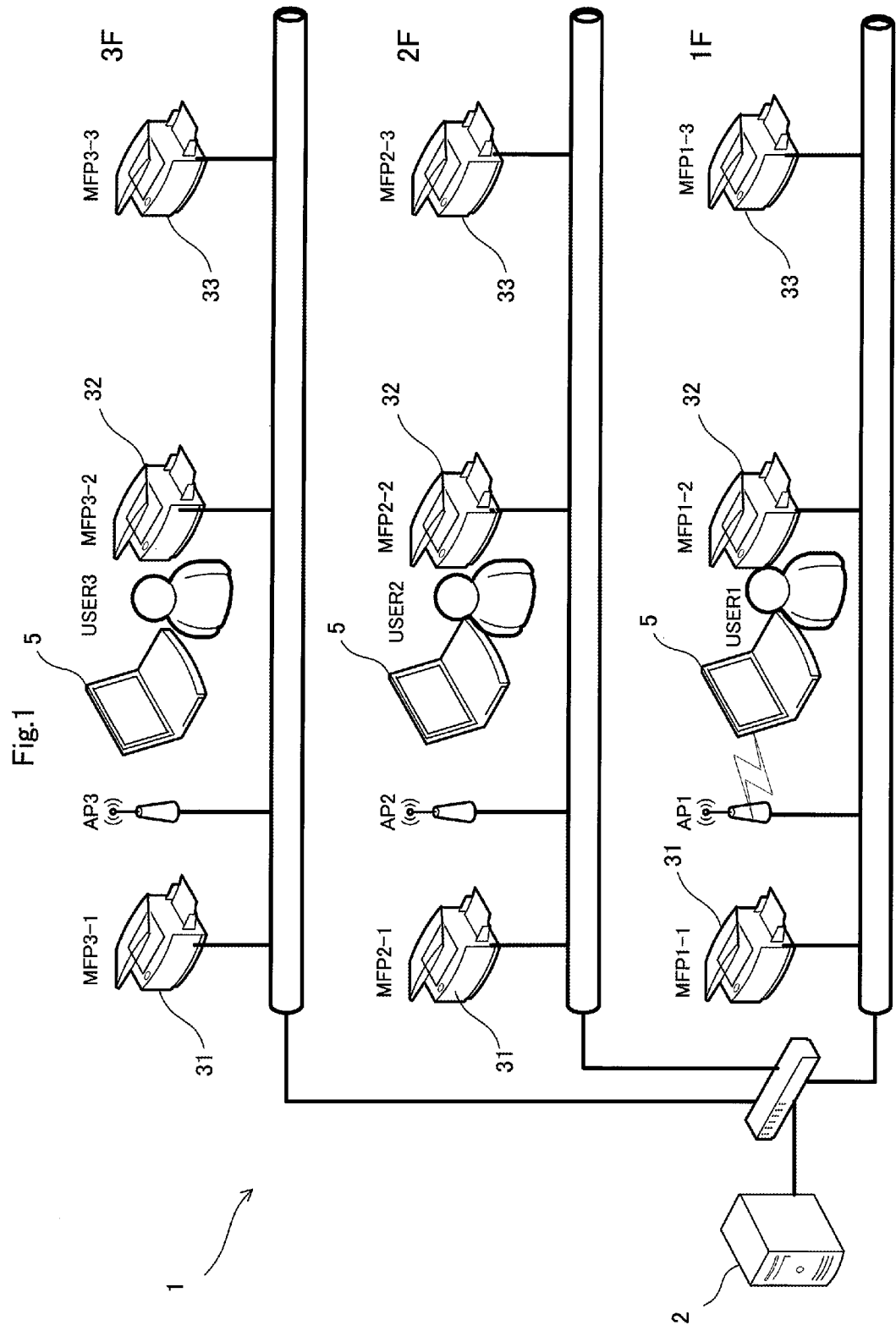
FIG. 1 is a configuration diagram of a printing data delivery system.
Figure 2:
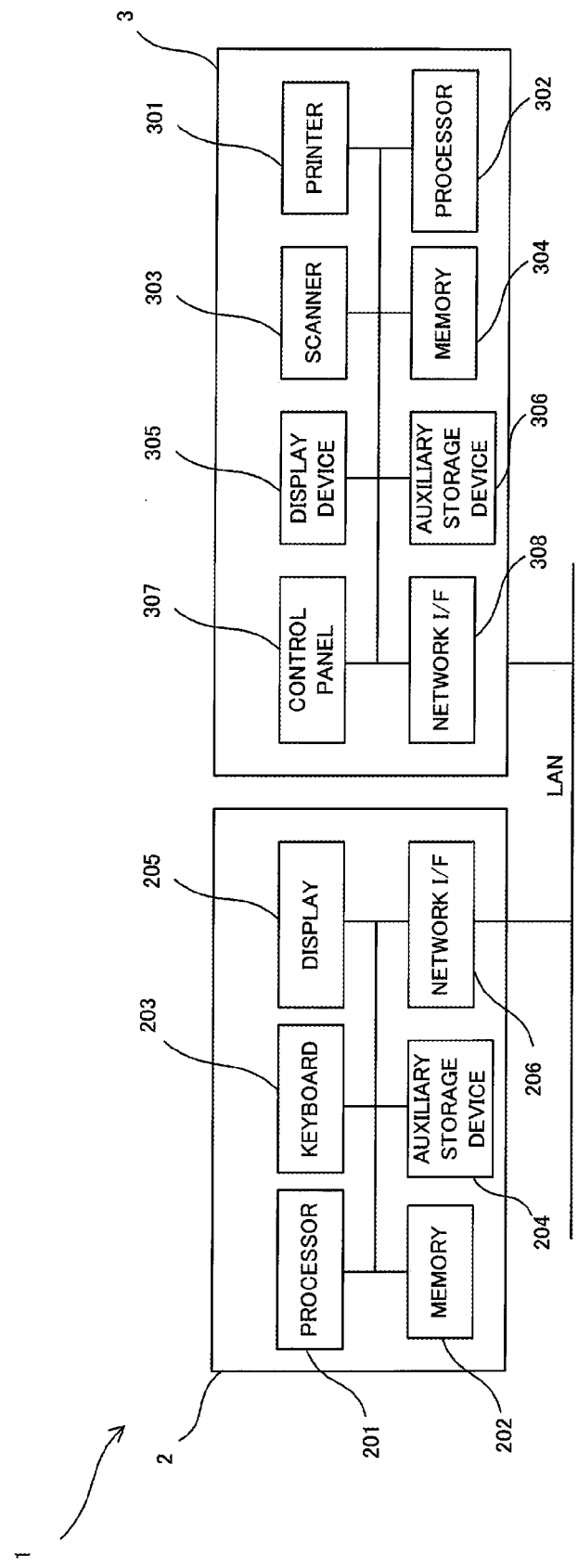
FIG. 2 is a configuration diagram of a printing data delivery apparatus and a printing apparatus.

FIG. 1 is a diagram of a schematic configuration of a printing data delivery system 1, which is an example of this embodiment. FIG. 2 is a hardware block diagram of a printing data delivery apparatus 2 and a printing apparatus 3 included in the printing data delivery system 1 according to this embodiment.

As shown in FIG. 1, in the printing data delivery system according to this embodiment, plural client terminal apparatuses 5, the printing data delivery apparatus 2, and plural printing apparatuses 31 to 33 (hereinafter referred to as printing apparatuses 3 when generally named) are connected to be capable of communicating with one another through a telecommunication line (which may be either wired or wireless) such as a LAN (Local Area Network).

The client terminal apparatuses 5 are, for example, PCs that users use as network terminals. The client terminal apparatuses 5 include processors (not shown), memories (not shown), and auxiliary storage devices (not shown). The processors execute computer programs stored in the memories or the auxiliary storage devices to thereby realize various kinds of processing such as data transmission and reception, print setting, and a printing instruction in the client terminal apparatuses 5. The client terminal apparatuses 5 communicate with the printing data delivery apparatus 2 via, for example, communication apparatuses at access points AP1 to AP3 as shown in FIG. 1. The users transmit printing data to the printing data delivery apparatus 2 using printer drivers or the like installed in the client terminal apparatuses 5.

The printing data delivery apparatus 2 includes a function of a server. The printing data delivery apparatus 2 includes, as shown in FIG. 2, a processor 201, a memory 202, a keyboard 203, an auxiliary storage device 204, a display 205, and a network I/F 206. The processor 201 executes computer programs stored in the memory 202 and the auxiliary storage device 204 to thereby realize various kinds of processing such as determination processing and data transmission processing in the printing data delivery apparatus 2. The auxiliary storage device 204 can be, for example, a HDD (Hard Disk Drive). The auxiliary storage device 204 stores printing data output from all the client terminal apparatuses 5 connected to a network (in particular, a location-free printing system environment). Since the data output from the client terminal apparatuses 5 on the network are managed in one place in this way, the users can output the printing data with arbitrary printing apparatuses 3. Consequently, if the printing apparatuses 3 about to output the printing data output a large amount of printing data or if the printing apparatuses 3 are broken, it is possible to output the printing data avoiding these printing apparatuses 3.

The printing apparatus 3 is, for example, an MFP (Multi Function Peripheral). The printing apparatus 3 includes, as shown in FIG. 2, a printer 301, a processor 302, a scanner 303, a memory 304, a display device 305, an auxiliary storage device 306, a control panel 307, and a network I/F 308. The processor 302 executes a computer program stored in the memory 304 or the auxiliary storage device 306 to thereby realize various kinds of processing such as data transmission and reception and print processing in the printing apparatus 3. The printer 301 print-outputs, to printing media, printing data captured by the scanner 303 and printing data output from a PC and transmitted to the printing apparatus 3 via the network I/F 308. The control panel 307 receives an operation input by a user in the printing apparatus 3 and a display output in the display device 305. The display device 305 display-outputs, to the control panel 307, for example, content changed by an operation input by the user and information concerning a printing job output by the printing apparatus 3. The printing apparatus 3 includes a security function for setting a security level concerning the printing data, a stapling function for applying stapling to the printing data, an N in 1 function, a simplex printing function, and a reuse paper using function.

The printing apparatus 3 is configured as follows according to types of printing toners: a printing apparatus that performs printing only with erasable toner or ink (hereinafter referred to as printing apparatus for reusable sheets 31), a printing apparatus that performs printing with any selected one of the erasable toner or ink and unerasable toner or ink and (hereinafter referred to as reuse selectable printing apparatus 32), and a printing apparatus that performs printing only with the unerasable toner or ink (hereinafter referred to as printing apparatus for unreusable sheets 33).

The printing apparatus for reusable sheets 31 prints printing data output from a PC or the like to the apparatus on a printing medium with the erasable toner or ink. Since only the erasable toner or ink is filled in the printing apparatus for reusable sheets 31, all the printing data are output only with the erasable toner or ink.

The reuse selectable printing apparatus 32 prints printing data output from a PC or the like to the apparatus on a printing medium with any one of the erasable toner or ink and the unerasable toner or ink selected by a user. The user selects the printing with the erasable toner or ink or the unerasable toner or ink on the PC or the control panel 307 of the reuse selectable printing apparatus 32.

The printing apparatus for unreusable sheets 33 prints printing data output from a PC or the like to the apparatus on a printing medium with the unerasable toner or ink. Since only the unerasable toner or ink is filled in the printing apparatus for unreusable sheets 33, all the printing data are output with only the unerasable toner or ink. Therefore, all printing media printed by the printing apparatus for unreusable sheets 33 cannot be reused.

The printing data delivery apparatus 2 is explained below with reference to FIG. 3.

The printing data delivery apparatus 2 includes a printing-data receiving section 21, a data storing section 22, a printing-request receiving section 23, a reuse determining section 24, an apparatus-information storing section 25, a completed-data deleting section 26, a filter-off function section 27, and a printing-data delivery section 28.

The units in the printing data delivery apparatus 2 are realized by a configuration (a configuration A) including the processor 201, the memory 202, and the auxiliary storage device 204. A computer program stored in the auxiliary storage device 204 in advance is read into the memory 202. The processor 201 executes an arithmetic operation of the computer program read into the memory 202, whereby the units are realized. The filter-off function section 27 is realized by a configuration including the keyboard 203 in addition to the configuration A.

The printing-data receiving section 21 receives printing data (PDL (Page Description Language), etc.) transmitted from the client terminal apparatus 5. The printing data includes, besides image data (an image) to be output, information concerning various functions (a security function, a stapling function, etc.) by selection of the printing apparatus 3 by the user.

The data storing section 22 analyzes the printing data received by the printing-data receiving section 21 and extracts print setting information such as a color mode, the number of copies, a duplex mode, an N in 1 mode, a user ID, presence or absence and positions of stapling, and presence or absence and positions of punching. The data storing section 22 associates the extracted print setting information and the printing data and forms a printing job management table shown in FIG. 4. The data storing section 22 stores determination information by the reuse determining section 24 in the printing job management table as well in association with the print setting information and the printing data.

The reuse determining section 24 determines whether the printing apparatus 3 that transmits a printing job request is an apparatus that performs printing with erasable toner or an apparatus that performs printing with unerasable toner (first determination), determines, on the basis of the print setting information stored in the data storing section 22, whether an image in printing data can be printed with the erasable toner (second determination), and gives, on the basis of results of the first determination and the second determination, to the print setting information, information indicating whether it is appropriate to print the printing data in the printing apparatus 3, which transmits the printing job request, and generates a printing job (first generation). In the first determination, the reuse determining section 24 performs the determination according to whether information concerning toner or ink of the printing apparatus 3, which transmits the printing job request, stored in the apparatus-information storing section 22 is the erasable toner or ink or the unerasable toner or ink. These kinds of information are stored in the apparatus-information storing section 25 in advance. In the second determination, the reuse determining section 24 compares print setting information (e.g., security printing, stapling, and punching) corresponding to the printing job stored in the printing-data storing section 22 with a setting table shown in FIG. 5 in which reusability is set in advance and determines whether the print setting information is print setting information for reusable sheets. The printing data is data of unreusable sheets if, as shown in FIG. 5, a level of security printing is level 3 (a level for prohibiting viewing by people other than the user), a stapling function is set, a hole punching function is set ON, printing using reverse side paper is set, or a printing medium is printed five or more times by a reuse paper using function.

The printing-request receiving section 23 receives a printing job request, a printing job list request, a completion notification, or the like from the printing apparatus 3 and transmits the request or the notification to the reuse determining section 24 or the completed-data deleting section 26.

If the printing job generated by the reuse determining section 24 has print setting information including information indicating that it is inappropriate to perform printing in the printing apparatus 3 that receives the printing job request or the like, the filter-off function section 27 reproduces the printing job to neglect the information indicating that it is inappropriate to perform printing.

The completed-data deleting section 26 deletes a printing job subjected to print processing from a printing job list generated by the reuse determining section 24.

The printing-data delivery section 28 transmits the printing job list and the printing job generated by the reuse determining section 24 to the printing apparatus 3. The printing apparatus 3 executes various kinds of processing using the data received from the printing data delivery apparatus 2.

The printing apparatus 3 is explained below with reference to FIG. 6.

The printing apparatus 3 includes, as shown in FIG. 6, a printing-job requesting section 34, an information acquiring section 35, a printing-job receiving section 36, a display section 37, a printing-job determining section 38, and a printing-job executing section 39.

The units in the printing apparatus 3 are realized by a configuration (a configuration B) including the processor 302, the memory 304, and the auxiliary storage device 306. A computer program stored in the auxiliary storage device 306 in advance is read into the memory 304. The processor 302 executes an arithmetic operation of the computer program read into the memory 304, whereby the units are realized. The printing-job receiving section 36 is realized by a configuration including the scanner 303 (if image data is acquired by scanning an original document) in addition to the configuration B. Further, the printing-job executing section 39 is realized by a configuration including the printer 301 in addition to the configuration B.

The information acquiring section 35 receives user information and user operation input information according to an operation input to the control panel 307 by the user. The information acquiring section 35 generates a printing job list request and a printing job request on the basis of the acquired operation input information.

The printing-job requesting section 34 transmits the printing job list request and the printing job request generated by the information acquiring section 35 or a completion notification generated by the printing-job determining section 38 to the printing-request receiving section 23.

The printing-job receiving section 36 receives a printing job list, a printing job, or printing data transmitted from the printing-data delivery section 28.

If the user selects a printing job displayed on the control panel 307 by the display section 37, the printing-job determining section 38 determines whether print setting information of the printing job includes information indicating that it is inappropriate to print an image in the printing apparatus 3. If the printing-job determining section 38 determines that the print setting information does not include the information indicating that it is inappropriate to print an image in the printing apparatus 3, the printing-job determining section 38 sends printing data including an image to the printing-job executing section 39. If the printing-job determining section 38 determines that the print setting information includes the information indicating that it is inappropriate to print an image in the printing apparatus 3, the printing-job determining section 38 display-outputs, on the display section 37, to the effect that it is inappropriate to execute print processing of the printing data in the printing apparatus 3. According to an operation input to the control panel 307 by the user, the printing-job determining section 38 sets a flag for neglecting the print processing ON or OFF in the printing data. Further, the printing-job determining section 38 generates a completion notification for deleting the printing data subjected to the print processing in the printing-job executing section 39 from the printing job list.

The printing-job executing section 39 executes the print processing on the basis of a determination result in the printing-job determining section 38 and presence or absence of the flag for neglecting the print processing affixed to the printing job.

The display section 37 displays the printing job list and the like received in the printing-job receiving section 36 on the control panel 307.

Figure 7A:
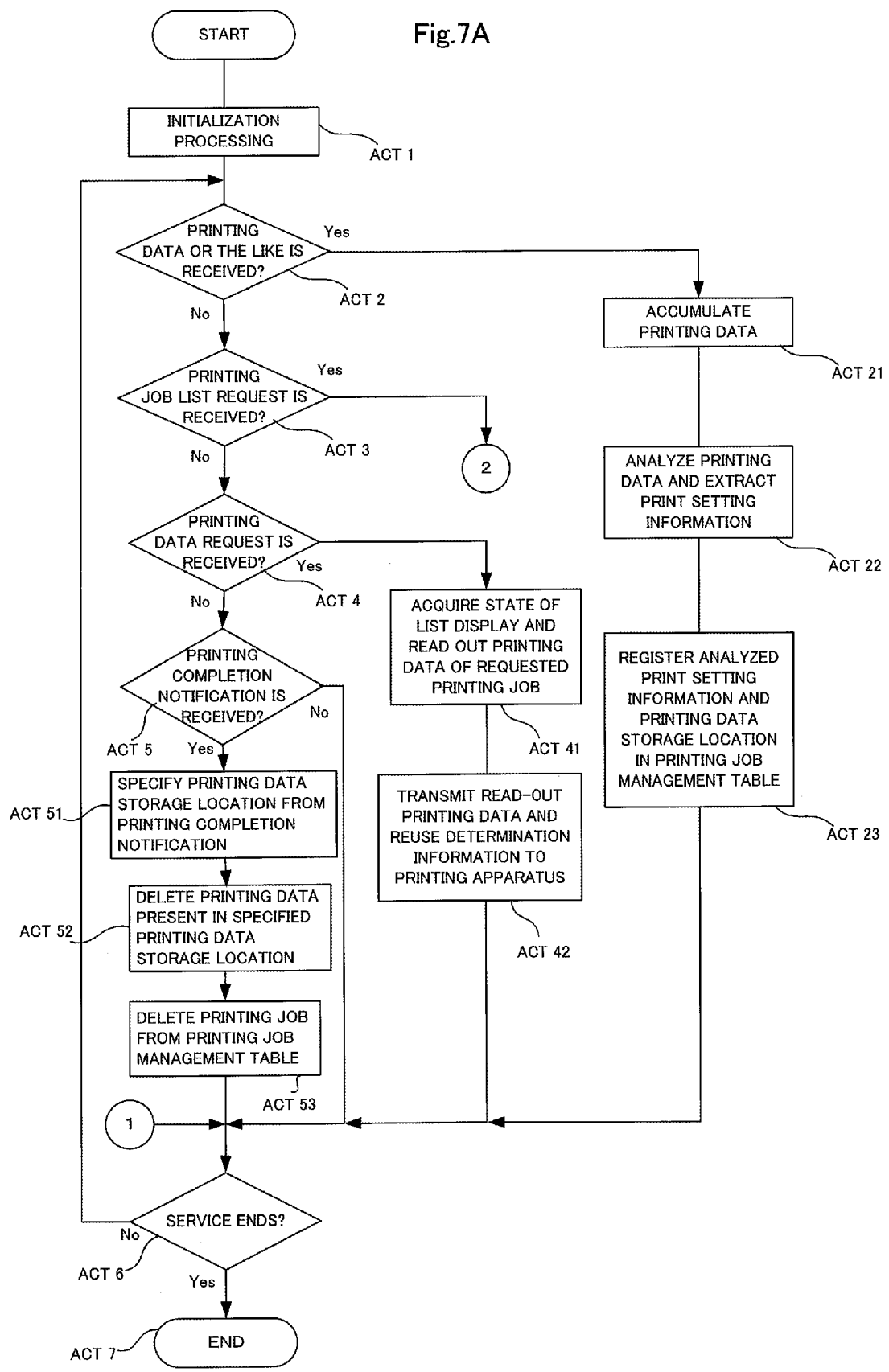

Control processing of the printing data delivery apparatus 2 according to this embodiment is explained below with reference to FIGS. 7A and 7B.

First, the printing data delivery apparatus 2 performs initialization processing necessary for the operation of the printing data delivery apparatus 2 (ACT 1). After the initialization processing is performed, the printing-request receiving section 23 monitors reception events of, for example, printing data from the client terminal apparatus 5 and a transmission request for a printing job list, a transmission request for printing data, and a printing completion notification from the printing apparatus 3. The printing-data requesting section 23 receives the reception events (ACT 2). If the printing-data receiving section 21 receives printing data from the client terminal apparatus 5, the printing-data receiving section 21 sends the printing data to the data storing section 22 (ACT 21). The data storing section 22 analyzes the printing data sent to the data storing section 22 and extracts print setting information such as a color mode, the number of copies, a duplex mode, an N in 1 mode, a user ID, presence or absence and positions of stapling, and presence or absence and positions of punching (ACT 22). The data storing section 22 adds the extracted print setting information to the printing job management table in a format shown in FIG. 4 in association with an image in the printing data and updates the printing job management table stored in the data storing section 22 (ACT 23).

If the printing-data receiving section 21 does not receive printing data from the client terminal apparatus 5 and the printing-request receiving section 23 receives a printing job list request from the printing apparatus 3, the printing-request receiving section 23 sends the printing job list request to the reuse determining section 24 (ACT 3). The reuse determining section 24 acquires, on the basis of the printing job list request, the specifications of the printing apparatus 3, in particular, information concerning toner or ink filled in the apparatus stored in the apparatus-information storing section 25 (ACT 31). The reuse determining section 24 acquires a printing job corresponding to the printing job list request from the printing job management table stored in the data storing section 22 (ACT 32).

The reuse determining section 24 determines, on the basis of configuration information of the printing apparatus 3 acquired from the apparatus-information storing section 25, whether the requesting printing apparatus 3 is an apparatus that uses the erasable ink or toner or an apparatus that uses the unerasable toner or ink (ACTS 33 and 34, first determination).

According to a result of the determination, the reuse determining section 24 determines which of the printing apparatus for unreusable sheets 33, the reuse selectable apparatus 32, and the printing apparatus for reusable sheets 31 the printing apparatus 3 that outputs the printing job list request is. Specifically, if the reuse determining section 24 determines, referring to the configuration information of the printing apparatus 3, that the printing apparatus 3 cannot perform printing with the erasable toner or ink, the reuse determining section 24 determines that the printing apparatus 3 is the printing apparatus for unreusable sheets 33 (NO in ACT 33). If the reuse determining section 24 determines, referring to the configuration information of the printing apparatus 3, that the printing apparatus 3 can perform printing with the erasable toner or ink and can perform printing with the unerasable toner or ink as well, the reuse determining section 24 determines the printing apparatus 3 is the reuse selectable apparatuses 32 (YES in ACT 34). If the reuse determining section 24 determines, referring to the configuration information of the printing apparatus 3, that the printing apparatus 3 can perform printing with the erasable toner or ink but cannot perform printing with the unerasable toner or ink, the reuse determining section 24 determines that the printing apparatus 3 is the printing apparatus for reusable sheets 31 (NO in ACT 34).

As explained above, after the reuse determining section 24 determines which of the printing apparatus for unreusable sheets 33, the reuse selectable apparatus 32, and the printing apparatus for reusable sheets 31 the printing apparatus 3 that outputs the printing job list request is, the reuse determining section 24 determines whether the printing job acquired from the printing job management table includes print setting inappropriate for reuse (ACTS 35, 36, and 37). In other words, after determining which type of a printing apparatus the printing apparatus 3 is, the reuse determining section 24 determines whether the print setting information included in the printing job shown in FIG. 4 is print setting set as NG during use in FIG. 5. For example, in Job00004 in FIG. 4, the stapling function is enabled. On the other hand, in FIG. 5, a reuse determination condition is NG during use if the stapling function is set. Therefore, reuse is prohibited in Job00004. According to these two determination results, if the printing apparatus 3 and the print setting information do not coincide with each other, a printing job including a flag to be displayed on the display section 37 in a gray-out state to disable the user to select the printing job is formed (ACTS 41, 42, 43, and 44). The ruse determining section 24 may give, according to the determination whether print setting inappropriate for reuse is included in the printing job, to the print setting information, information indicating whether a sheet after printing of the image of the printing data is reusable.

Specifically, the reuse determining section 24 determines that the printing apparatus 3 is the printing apparatus for unreusable sheets 33 and the print setting information corresponding to the image in the printing data acquired from the printing job management table (hereinafter, print setting information corresponding to the printing data) does not include print setting inappropriate for reuse, the reuse determining section 24 adds print setting information for reusable sheets to the print setting information. The reuse determining section 24 adds a flag displayed in a gray-out state on the display section 37 simultaneously with the addition of the print setting information for reusable sheets and adds the flag to the printing job list transmitted to the printing apparatus 3 (ACT 41). If the printing apparatus 3 is the printing apparatus for unreusable sheets 33 and the print setting information corresponding to the printing data is inappropriate for reuse and if the printing apparatus 3 is the reuse selectable apparatus 32 and the print setting information corresponding to the printing data is inappropriate for reuse, the reuse determining section 24 adds print setting information for unreusable sheets to the print setting information and adds the print setting information for unreusable sheets to the printing job list (ACT 42). If the reuse determining section 24 determines that the printing apparatus 3 is the reuse selectable apparatus 32 and the print setting information corresponding to the printing data does not include print setting inappropriate for reuse and if the reuse determining section 24 determines that the printing apparatus 3 is the reuse selectable apparatus 32 and the print setting information corresponding to the printing data does not include print setting inappropriate for reuse, the reuse determining section 24 adds print setting information for reusable sheets to the print setting information and adds the print setting information for reusable sheets to the printing job list (ACT 43). If the reuse determining section 24 determines that the printing apparatus 3 is the reuse selectable apparatus 32 and the print setting information corresponding to the printing data includes print setting inappropriate for reuse, the reuse determining section 24 adds print setting information for unreusable sheets to the print setting information. The reuse determining section 24 adds a flag displayed in a gray-out state on the display section 37 simultaneously with the addition of the print setting information for unreusable sheets and adds the flag to the printing job list (ACT 44).

The printing data delivery apparatus 2 may include the filter-off function section 27 to enable the printing apparatus 3 to perform execution processing for a printing job even if the printing job is inappropriate for the printing apparatus for unreusable sheets 33 and the printing apparatus for reusable sheets 31. Specifically, after it is determined whether print setting information corresponding to printing data in the printing apparatus for unreusable sheets 33 and the printing apparatus for reusable sheets 31 includes print setting inappropriate for reuse, the filter-off function section 27 determines whether a filter is on or off (ACTS 38 and 39). In the following two cases of the determination by the filter-off function section 27, the filter-off function section 27 adds print setting information for neglecting print setting information including information indicating that there is setting inappropriate for printing the printing data in the printing apparatus 3. In the first case, the filter-off function section 27 determines that the filter is set ON and the reuse determining section 24 determines that the printing apparatus 3 is the printing apparatus for unreusable sheets 33 and the print setting information including information indicating that setting inappropriate for printing the printing data in the printing apparatus for unreusable sheets 33 is present in the printing job generated by the reuse determining section 24 (ACT 40). In the second case, the filter-off function section 27 determines that the filter is set ON and the reuse determining section 24 determines that the print setting information includes the information indicating that setting inappropriate for printing the printing data in the printing apparatus for reusable sheets 31 is present (ACT 45). In this way, the filter-off function section 27 can execute the printing job on the basis of the intention of the user even in the print setting unsuitable for outputting the printing data in the printing apparatuses 3.

The reuse determining section 24 determines whether the processing in ACTS 33 to 45 is performed for all printing jobs in the printing job list request (ACT 46). If it is determined that not all the printing jobs included in the printing job list request are determined by the reuse determining section 24, the reuse determining section 24 acquires the next printing job in the printing job list request from the printing job management table and performs the determination in the reuse determining section 24 (ACT 48).

If the reuse determining section 24 performs the determination for all the printing jobs included in the printing job list request, the reuse determining section 24 sends the printing job list to the printing-data delivery section 28 (ACT 47). The printing data delivery apparatus 2 completes the operation (ACTS 6 and 7).

It is advisable that, on the basis of the printing job list request received by the printing-data receiving section according to the control explained above, the reuse determining section 24 outputs a printing job list obtained by adding determination information to all the printing jobs (second generation) to the control panel 307 of the printing apparatus 3 in a format explained below.

For example, if the printing apparatus 3 that requests a printing job list is the reuse selectable printing apparatus 32, the reuse determining section 24 generates a printing job list to display a display output shown in FIG. 8 on the control panel 307 of the printing apparatus 3. The display section 37 displays an icon indicating reusability in a reusability space corresponding to printing data of reusable sheets. According to this display, the user can recognize at a glance that a printing job about to be printed now a printing job for reusable sheets.

Figure 9:
FIG. 9 is a display diagram of a printing job list in a reuse selectable printing apparatus.

When the printing apparatus 3 that transmits the printing job list request is the printing apparatus for reusable sheets 31, the display section 37 performs a display output shown in FIG. 9. Concerning a printing job for reusable sheets, the reuse determining section 24 performs a display output of all items. Concerning a printing job for unreusable sheets, the reuse determining section 24 performs a display output for displaying a print setting space in a gray-out state to disable the user to select the printing data. Consequently, it is possible to prevent the user from executing a printing job unsuitable for the printing apparatus 3. In other words, it is possible to prevent execution of print processing by a wrong operation input by the user. Therefore, it is possible to prevent the printing apparatus 3 from uselessly consuming printing media and toner or ink.

If the printing apparatus 3 that receives an apparatus request is the printing apparatus for unreusable sheets 33, the display section 37 performs a display output shown in FIG. 10. In this case, in a manner opposite to that in the printing apparatus for reusable sheets 31, concerning printing data of reusable sheets, the display section 37 performs a display output for displaying the print setting space and the reusability space in a gray-out state. Consequently, it is possible to prevent the user from selecting by mistake a printing job unsuitable for the printing apparatus 3 displayed on the control panel 307. Both of the print setting space and the reusability space are displayed in a gray-out state in the printing apparatus for unreusable sheets 33 because the reusability space is unnecessary in the printing apparatus for unreusable sheets 33.

If display on the control panel 307 of the printing apparatus for reusable sheets 31 shown in FIG. 9 and display on the control panel 307 of the printing apparatus for unreusable sheets 33 shown in FIG. 10 are performed, when the user sets the filter function (the filter-off function section 27) to OFF, the display section 37 performs a display output shown in FIG. 11. Consequently, the user can execute even a printing job unsuitable for setting of each printing apparatus (the printing apparatus for reusable sheets 31 or the printing apparatus for unreusable sheets 33).

Further, the printing apparatus 3 may be configured to acquire collective selection information on the control panel 307 of the printing apparatus 3. If the collective selection information is acquired by the information acquiring section 35, all printing jobs displayed on the control panel 307 can be collectively selected. As a specific example, the display of the printing apparatus for reusable sheets 31 shown in FIG. 9 is changed to display shown in FIG. 12. In this way, only printing jobs suitable for the setting of the printing apparatus 3 are selected by one operation by the user excluding those already displayed in a gray-out state as unsuitable for the setting of the printing apparatus 3 by printing apparatus for reusable sheets 31. Consequently, it is possible to save labor and time of the user for selecting necessary printing jobs from the control panel 307 many times.

Figure 12:
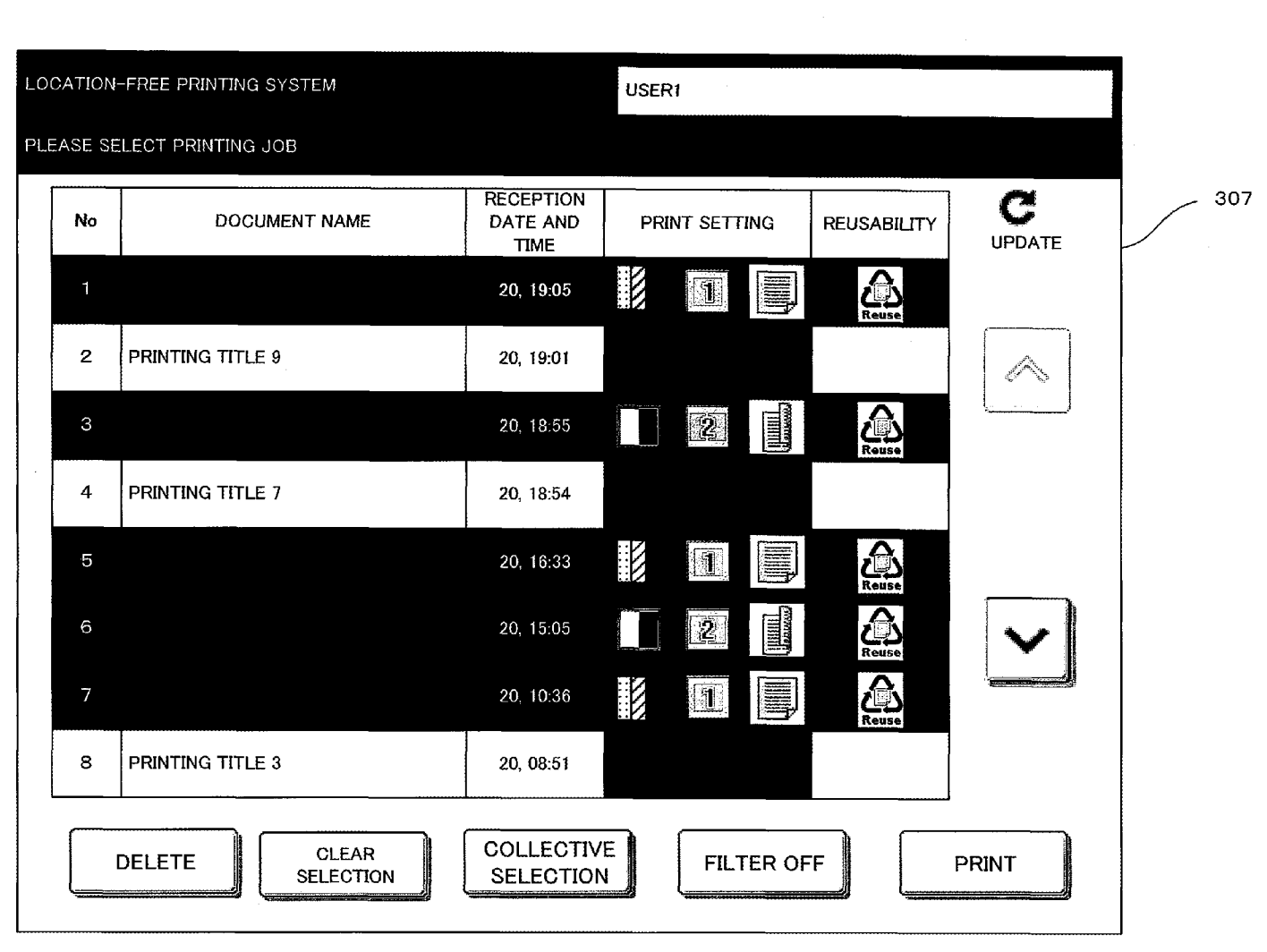
Figure 13:
FIG. 13 is a display diagram of a printing job list displayed when printing jobs are collectively selected during ON setting of the filter OFF function of the printing apparatus for reusable sheets.

In the printing apparatus for reusable sheets 31 in which the printing jobs are collectively selected as shown in FIG. 12, if the user sets the filter function to OFF, display shown in FIG. 13 is performed. Consequently, irrespective of apparatus information of the printing apparatus 3, the user can execute all the printing jobs displayed on the control panel 307.

Subsequently, if the user selects a specific profiting job from the printing job list displayed on the control panel 307, the printing data delivery apparatus 2 performs the processing explained below again. When the printing-request receiving section 23 receives a printing job request as shown in FIG. 7A, the printing-request receiving section 23 sends the printing job request to the reuse determining section 24 (ACT 4). The reuse determining section 24 acquires, on the basis of the sent printing job request, printing data corresponding to the printing job request from the printing-data storing section 25 (ACT 41). The reuse determining section 24 acquires, on the basis of the printing job request, print setting information indicating determination of erasability by the reuse determining section 24 (hereinafter referred to as determination information) from the printing job management table. The reuse determining section 24 sends these kinds of information to the printing-data delivery section 28 and prints printing data (ACTS 42, 6, and 7).

When the printing-request receiving section 23 receives a printing completion notification from the printing apparatus 3, the printing-request receiving section 23 notifies the completed-data deleting section 26 of the printing completion notification. The completed-data deleting section 26 searches through the printing job management table stored in the data storing section 22 and specifies a place where printing data corresponding to the printing completion notification is stored (ACT 51). The completed-data deleting section 26 deletes the printing data corresponding to the printing completion notification from the specified place of the printing-data storing section 22 and deletes the printing job corresponding to the printing completion notification in the printing job management table (ACTS 52 and 53). After these operations, the printing-data delivery apparatus 2 ends the operation (ACTS 6 and 7).

Control processing of the printing apparatus 3 for outputting printing data delivered from the printing data delivery apparatus 2 according to this embodiment is explained below with reference to FIGS. 14A and 14B.

First, the printing apparatus 3 performs initialization processing in the printing apparatus 3 (ACT 8). The information-acquiring section 35 acquires user information of the user and performs user authentication. If the user authentication is correctly performed, the information acquiring section 35 generates a printing job list request in order to display, as a list, printing jobs received by the printing apparatus 3. The printing job list request generated by the information acquiring section 35 is sent from the information acquiring section 35 to the printing-job requesting section 34. The printing-job requesting section transmits the printing job list request to the reuse determining section 24 via the printing-request receiving section 23 and the printing-job receiving section 36. The printing-job receiving section 36 receives, on the basis of the transmitted printing job list request, a printing job list including determination information by the reuse determining section 24 from the reuse determining section 24. The display section 37 displays the received printing job list on the control panel 307 and requests the user to select a printing job (ACT 83).

If the user selects a specific printing job from the printing job list displayed on the control panel 307, the information acquiring section 35 acquires selection information of the printing job and generates a printing job request. The information acquiring section 35 sends the printing job request generated by the information acquiring section 35 to the printing-job requesting section 34. The printing-job requesting section 34 transmits the printing job request to the printing-request receiving section 23 (ACTS 9 and 91). The printing-job receiving section 36 receives printing data and determination information on the basis of the printing request (ACT 92). This processing in ACT 92 is applied to all printing data in the printing job list (ACT 93).

If the printing-job receiving section 36 receives the printing job list, the printing apparatus 3 also performs work for checking determination whether it is appropriate to print the printing data in the printing apparatus 3 determined on the printing data delivery apparatus 2 side. Specifically, the printing-job determining section 38 determines whether determination information by the reuse determining section 24 and specifications (in particular, specifications concerning toner and ink) of the printing apparatus 3 that requests a printing job coincide with each other (ACT 94). If the printing-job determining section 38 determines that the determination information by the reuse determining section 24 and the specifications of the printing apparatus 3 that requests a printing job coincide with each other, the printing-job determining section 38 sets the flag for neglecting execution of the print processing by the printing apparatus 3 to OFF (ACT 98). The printing apparatus 3 executes the print processing on the basis of the printing job generated by the information acquiring section 35 (ACT 99). The printing-job determining section 38 transmits, concerning the printing job executed by the printing apparatus 3, a printing completion notification indicating the printing job is completed from the printing apparatus 3 to the printing-data delivery apparatus 2 and deletes the printing data stored in the data storing section 22 (ACT 100). The printing-job determining section 38 determines whether all printing jobs are processed. If the printing-job determining section 38 determines that not all the printing jobs are executed, the printing-job determining section 38 determines whether the next printing job in the printing job management table and the use of the printing apparatus 3 coincide with each other (ACTS 101 and 94). If the printing-job determining section 38 determines that all the printing jobs are executed in the printing apparatus 3, the printing-job determining section 38 sends a printing job deletion request to the printing-job requesting section 34 to request the printing-job requesting section 34 to delete the printing job executed in the printing apparatus 3 from the printing job management table managed by the printing data delivery apparatus 2. The printing-job determining section updates the printing management table in the printing data delivery apparatus 2 (ACT 102). Thereafter, the printing apparatus 3 receives user authentication by the user again (ACT 81).

Figure 15:
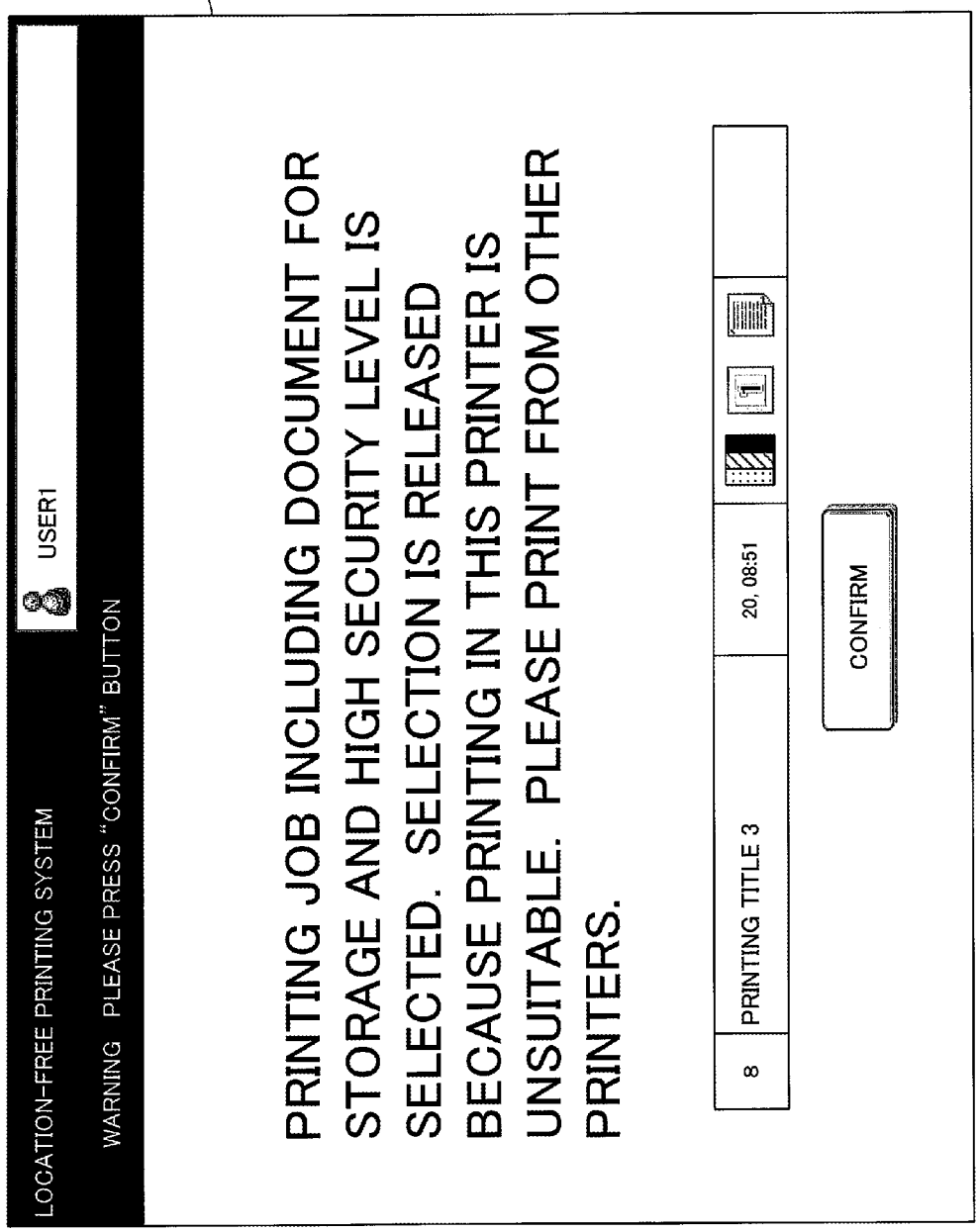
FIG. 15 is a display diagram of a control panel displayed when a printing job having a high security level is included in the printing apparatus for reusable sheets.

If the printing-job determining section 38 determines that the determination information determined by the reuse determining section 24 and the specifications of the printing apparatus 3 that request a printing job do not coincide with each other, the printing-job determining section 38 outputs display on the display section 37 indicating that the printing job and the specifications of the printing apparatus 3 do not coincide with each other to the control panel 307 (ACT 95). For example, in the printing apparatus for reusable sheets 31, if a security level of a printing job generated by the information acquiring section 35 is level 3, the display section 37 performs display shown in FIG. 15 on the control panel 307 to call the user's attention to the fact that the printing job and the specifications of the printing apparatus 3 do not coincide with each other (ACT 95). Therefore, the display section 37 excludes the printing job determined as not coinciding with the specifications of the printing apparatus 3 by the printing-job determining section 38 from print processing targets. Concerning the printing job excluded from the processing targets, in order to inform the user which printing job is excluded from the print processing targets, "number", "document name", and "print setting" of the printing job excluded from the print processing targets may be displayed on the control panel 307.

Figure 16:
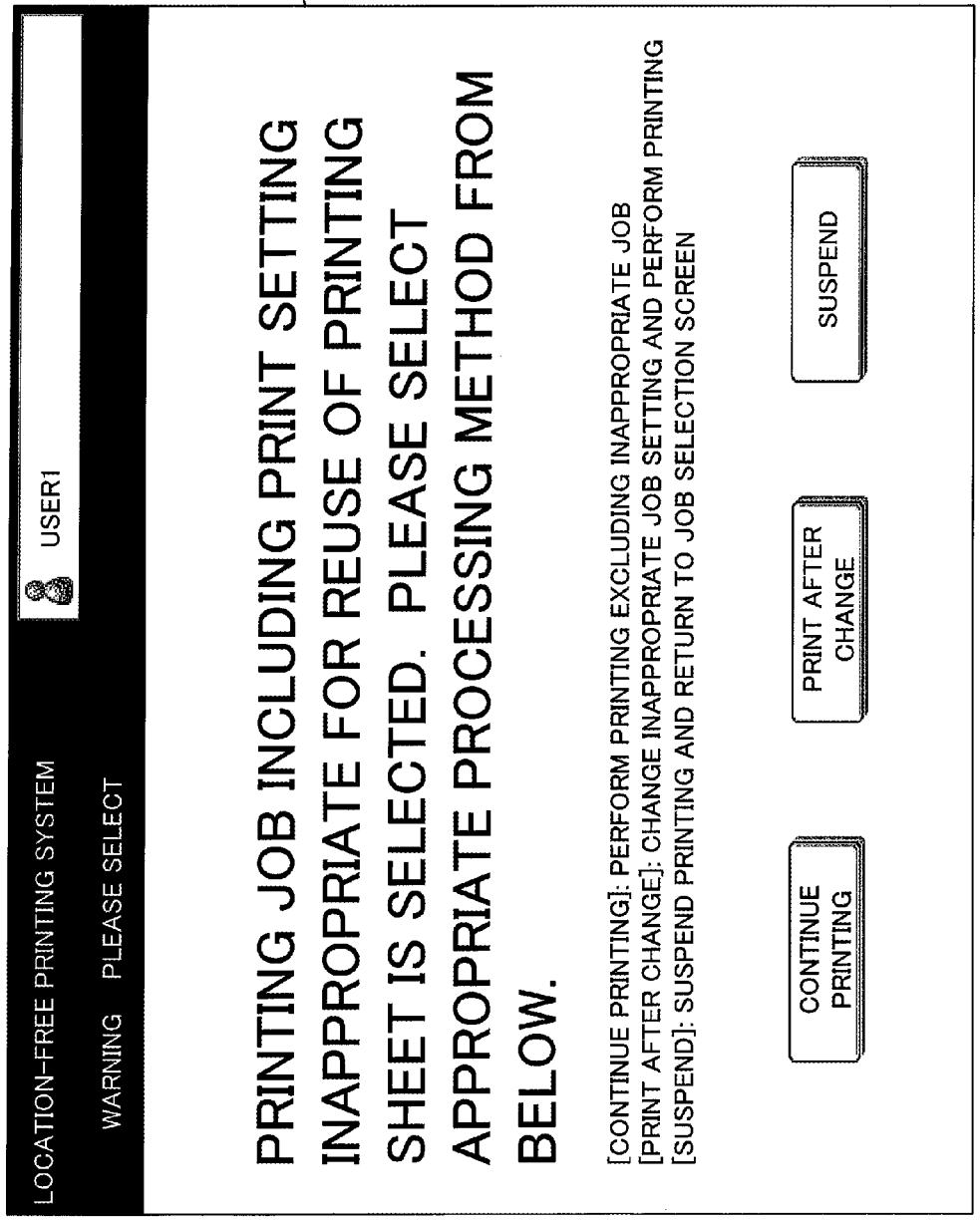
FIG. 16 is a display diagram of the control panel displayed when a selected printing job is unsuitable for reuse in the printing apparatus for reusable sheets.

In the printing apparatus for reusable sheets 31, if a selected printing job has print setting unsuitable for reuse, the printing-job determining section 38 may output display shown in FIG. 16 to the control panel 307 (ACT 95). Since the printing-job determining section 38 displays the display shown in FIG. 16 on the control panel 307, even if the printing job does not coincide with the specifications of the printing apparatus 3, the user can select, according to a demand of the user, processing from three processing operations: printing of the printing job (continue printing), printing after a change of the inappropriate printing job (print after change), and suspension of the inappropriate printing job (suspend) (ACT 96). If the user selects "continue printing" from a screen displayed on the control panel 307, the printing-job determining section 38 sets the flag for neglecting print processing to OFF and executes the printing job (ACTS 98 and 99). If the user selects "print after change" from the screen displayed on the control panel 307, the printing-job determining section 38 sets the flag for neglecting print processing to ON (ACT 97). The printing-job determining section 24 changes setting of a stapling function, a hole punching function, a reverse side paper using function, and a security level in print setting information of the printing data to be suitable for the printing apparatus 3. Thereafter, the printing-job executing section 39 transmits a notification of the execution of the print processing and the completion of the printing to the printing-data delivery apparatus 2 and shifts to the next printing job (ACTS 99, 100, and 101). If the user selects "suspend" from the screen displayed on the control panel 307, the printing-job determining section 38 suspends the printing job in which the determination information by the reuse determining section 24 and the specifications of the printing apparatus 3 are different and performs determination of the next printing job (ACT 101).

Further, in the case of the reuse selectable printing apparatus 32 and the erasable toner or ink, if a selected printing job has print setting unsuitable for reuse, the display section 37 may output display shown in FIG. 17 to the control panel 307 (ACT 95). Unlike the printing apparatus for reusable sheets 31 explained above, if the user selects "continue printing", the reuse selectable apparatus 32 can perform print output with the unerasable toner or ink suitable for the printing job (ACTS 97 and 99). Consequently, even if the user performs wrong setting of a printing job in the reuse selectable apparatus 32, the reuse selectable apparatus 32 can always execute print processing suitable for the printing job.

With this configuration, it is possible to prevent the user from executing a printing job from the printing apparatus 3 without noticing that print setting inappropriate for reuse of printing media is still applied to the printing apparatus 3. Even if print setting inappropriate for reuse of printing media is set in the printing apparatus 3, the user can easily change print setting suitable for reuse of printing media. Therefore, reuse of printing media is facilitated. As a result, it is possible to reduce sorting work for discarded documents.

Figure 14A:
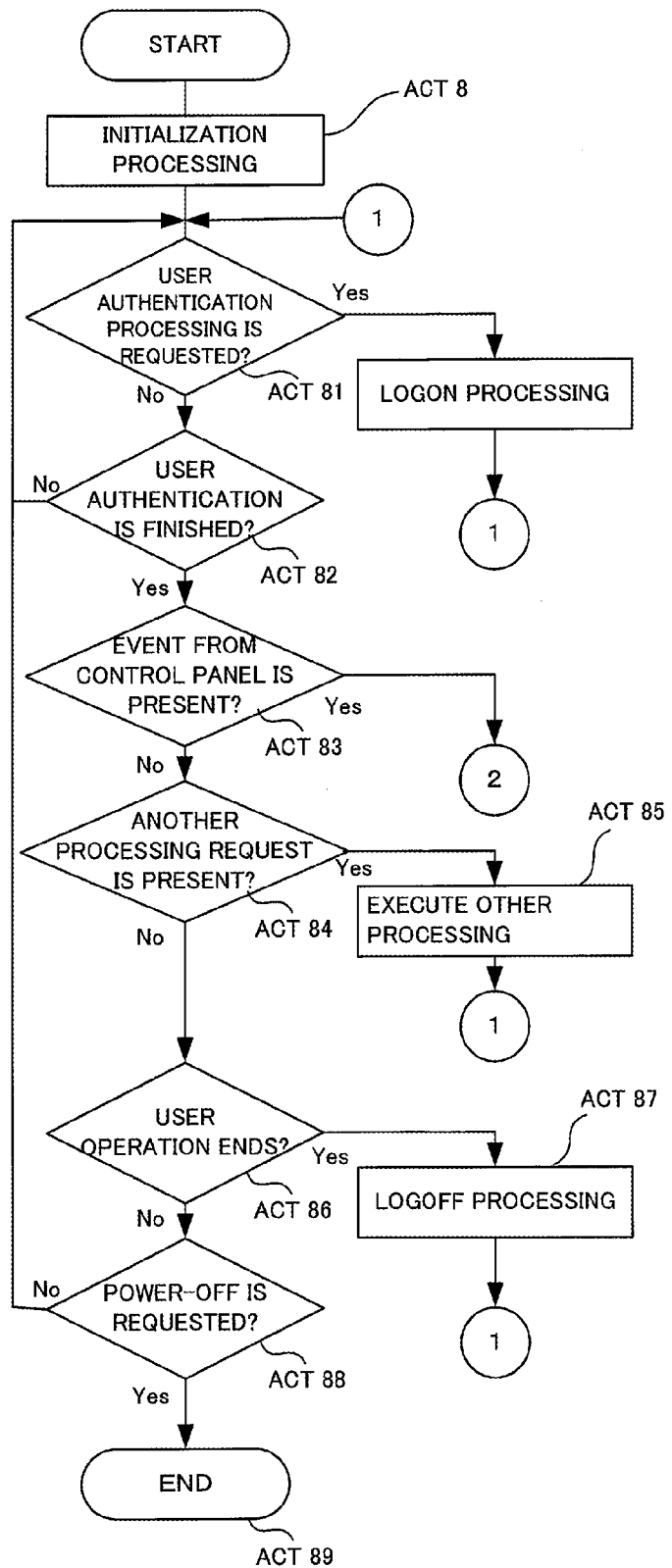

If the user selects a button other than a printing button on the control panel 307 in ACT 103 in FIG. 14B, the processing proceeds to the determination whether all the printing jobs are processed. The printing job list request processing and the display update are performed (ACTS 101 and 102). As shown in FIG. 14A, if the user authentication processing is correctly performed and the user does not perform an operation input to the control panel 307, the printing apparatus 3 determines whether there are another processing request (ACTS 81, 82, 83, and 84). If the user selects another processing request, the printing apparatus 3 executes the other processing and executes the user authentication determination again (ACTS 85 and 81). If the user does not select another processing request, the processing proceeds to determination whether the user ends the operation input on the control panel 307 (ACT 86). If the user ends the operation input on the control panel 307, the printing apparatus 3 performs LOGOFF processing and determines whether the user authentication processing is performed again (ACT 87). Conversely, if the user does not end the operation input, the printing apparatus 3 determines whether the user is requested to perform power-off on the control panel 307 (ACT 88). If the user selects power-off on the basis of the request for power-off displayed on the control panel 307, a power supply for the printing apparatus 3 is turned off (ACT 89). If the user does not respond to the request for power-off displayed on the control panel 307, the user authentication determination is performed again (ACT 81).

In the above explanation, the printing data delivery apparatus 2 and the printing apparatus 3 are explained as the separate configurations. However, the printing data delivery apparatus 2 and the printing apparatus 3 are not limited to this. The printing apparatus 3 may have the function of the printing data delivery apparatus 2. In this case, the printing-request receiving section 23 is configured to acquire an operation input of the user on the control panel 307. The printing-data delivery section 28 that transmits printing data from the printing data delivery apparatus 2 to the printing apparatus 3 is not provided. Furthermore, the reuse determining section 24 configured to perform determination for determining, on the basis of the print setting information stored in the data storing section 22, whether the printing data can be printed with the erasable toner, and perform first generation for giving, on the basis of the determination, to the print setting information, information indicating whether it is appropriate to print the printing data with the erasable toner, the control panel 307 of which is operated, and generating a printing job.

The order of the respective kinds of processing in the embodiments may be different from the order illustrated in the embodiments.

As explained in detail above, according to the technique described in this specification, it is possible to provide a technique that can reduce incidental work in handling of sheets after image formation.

While certain embodiments have been described, these embodiments have been presented by way of example only, and are not intended to limit the scope of invention. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printing data delivery apparatus comprising:
   a printing-data receiving section configured to receive printing data transmitted from a client terminal apparatus;
   a data storing section configured to extract print setting information from the printing data received by the printing-data receiving section and store the print setting information in association with an image in the printing data;
   a printing-request receiving section configured to receive a printing job request from a printing apparatus;
   a reuse determining section configured to perform first determination for determining whether the printing apparatus that transmits the printing job request to the printing-request receiving section is an apparatus that performs printing with erasable toner or an apparatus that performs printing with unerasable toner, perform second determination for determining, on the basis of the print setting information stored in the data storing section, whether the printing data can be printed with the erasable toner, and perform first generation for giving, on the basis of determination results of the first determination and the second determination, to the print setting information, information indicating whether it is appropriate to print the printing data in the printing apparatus that transmits the printing job request and generating a printing job; and
   a printing-data delivery section configured to transmit the printing job generated by the first generation of the reuse determining section to the printing apparatus that transmits the printing job request.

2. The apparatus according to claim 1, wherein the reuse determining section further gives, on the basis of the determination result in the second determination, to the print setting information, information indicating whether a sheet after printing of an image of the printing data is reusable.

3. The apparatus according to claim 1, wherein the reuse determining section further determines, in the first determination, which of the apparatus that performs printing with the erasable toner, the apparatus that performs printing with the unerasable toner, and an apparatus that can perform printing with the erasable toner or the unerasable toner the printing apparatus that transmits the printing job request is.

4. The apparatus according to claim 1, further comprising a filter-off function section configured to regenerate, if the printing job generated by the first generation of the reuse determining section has print setting information including information indicating that it is inappropriate to print the image in the printing apparatus, a printing job to neglect the information.

5. The apparatus according to claim 1, wherein, if the print setting information corresponding to the printing data received by the printing-data receiving section includes data indicating that a stapling function is enabled, a hole punching function is enabled, a reverse side paper using function is enabled, or a security level prohibits viewing by people other than a user, the reuse determining section determines in the second determination that the image in the printing data cannot be erased.

6. The apparatus according to claim 1, wherein
if the printing job request received by the printing-request receiving section is a printing job list request for displaying a plurality of the printing job requests in a list format, the reuse determining section further performs second generation for repeatedly applying the first determination, the second determination, and the first generation to all print data of the printing job list request to generate a printing job list in which a plurality of the printing jobs are displayed in a list format, and
the printing-data delivery section transmits the printing job list generated by the second generation of the reuse determining section to the printing apparatus that transmits the printing job list request.

7. A printing data delivery system comprising:
a printing data delivery apparatus including:
   a printing-data receiving section configured to receive printing data transmitted from a client terminal apparatus;
   a data storing section configured to extract print setting information from the printing data received by the printing-data receiving section and store the print setting information in association with an image in the printing data;
   a printing-request receiving section configured to receive a printing job request from a printing apparatus;
   a reuse determining section configured to perform first determination for determining whether the printing apparatus that transmits the printing job request to the printing-request receiving section is an apparatus that performs printing with erasable toner or an apparatus that performs printing with unerasable toner, perform second determination for determining, on the basis of the print setting information stored in the data storing section, whether the printing data can be printed with the erasable toner, and perform first generation for giving, on the basis of determination results of the first determination and the second determination, to the print setting information, information indicating whether it is appropriate to print the printing data in the printing apparatus that transmits the printing job request and generating a printing job; and
   a printing-data delivery section configured to transmit the printing job generated by the first generation of the reuse determining section to the printing apparatus that transmits the printing job request; and
a printing apparatus including:
   a printing-job receiving section configured to receive the printing job generated by the reuse determining section from the printing-data delivery section;
   a display section configured to display the printing job received by the printing-job receiving section on a control panel;
   a printing-job determining section configured to determine, if a user selects the printing job displayed on the control panel by the display section, whether information indicating that it is inappropriate to print the image in the printing apparatus is included in the print setting information of the printing job, transmit the printing data including the image if it is determined that the information is not included in the print setting information, and display-output, if it is determined that the information is included in the print setting information, to the display section, indication that it is inappropriate to execute print processing of the printing data in the printing apparatus; and
   a printing-job executing section configured to execute the printing processing of the printing data sent from the printing-job determining section.

8. The system according to claim 7, wherein, if the information indicating that it is inappropriate to print the image in the printing apparatus is included in the print setting information of the printing job received by the printing-job receiving section, the display section displays the printing job on the control panel in a format for disabling the user to select the printing job.

9. The system according to claim 8, wherein, if the information indicating that it is inappropriate to print the image in the printing apparatus is included in the print setting information of the printing job received by the printing-job receiving section, the format in which the display section displays the printing job on the control panel is gray-out display.

10. The system according to claim 8, wherein
the printing-data delivery apparatus further includes a filter-off function section configured to regenerate, if the printing job generated by the first generation of the reuse determining section has print setting information including information indicating that it is inappropriate to print the image in the printing apparatus, a printing job to neglect the information, and
the display section displays, if the filter-off function section is enabled, even the printing job displayed on the control panel in the format for disabling the user to select the printing job on the control panel such that the user can select the printing job.

11. The system according to claim 7, wherein
if the printing-job determining section determines that the information is included in the print setting information, the printing-job determining section display-outputs any one of printing without a change of print setting of the printing data, printing with a change of the print setting of the printing data, and neglect of the print processing of the printing data to the display section in a format for enabling the user to select the printing or the neglect, and the display section displays the printing job on the control panel on the basis of the display output of the printing-job determining section and requests the user to perform an operation input.

12. The system according to claim 7, wherein
if the printing job request received by the printing-request receiving section is a printing job list request for displaying a plurality of the printing job requests in a list format, the reuse determining section further performs second generation for repeatedly applying the first determination, the second determination, and the first generation to all print data of the printing job list request to generate a printing job list in which a plurality of the printing jobs are displayed in a list format, and
the printing-data delivery section transmits the printing job list generated by the second generation of the reuse determining section to the printing apparatus that transmits the printing job list request.

13. The system according to claim 11, wherein, if the printing-job determining section determines that the user selects the print with a change of the print setting of the printing data among the displays displayed by the display section on the control panel on the basis of the display output from the printing-job determining section, the printing-job determining section changes setting of a stapling function, a hole punching function, a reverse side paper using function, and a security level in the print setting information of the printing data to be suitable for the printing apparatus.

14. A printing apparatus comprising:
a printing-data receiving section configured to receive printing data transmitted from a client terminal apparatus;
a data storing section configured to extract print setting information from the printing data received by the printing-data receiving section and store the print setting information in association with an image in the printing data;
a printing-request receiving section configured to receive a printing job request according to operation of a control panel by a user;
a reuse determining section configured to perform determination for determining, on the basis of the print setting information stored in the data storing section, whether the printing data can be printed with the erasable toner, and perform first generation for giving, on the basis of the determination, to the print setting information, information indicating whether it is appropriate to print the printing data with the erasable toner, the control panel of which is operated, and generating a printing job;
a display section configured to display the printing job generated by the first generation of the reuse determining section on the control panel; and
a printing-job determining section configured to determine, if the user selects the printing job displayed by the display section, whether information indicating that it is inappropriate to print the image with the erasable toner is included in the print setting information of the printing job, execute the printing processing of the printing data by a printing-job executing section if it is determined that the information is not included in the print setting information, and display-output, if it is determined that the information is included in the print setting information, to the display section, indication that it is inappropriate to execute print processing with the erasable toner.

15. The apparatus according to claim 14, wherein, if the information indicating that it is inappropriate to print the image in the printing apparatus is included in the print setting information of the printing job generated by the first generation of the reuse determining section, the display section displays the printing job on the control panel in a format for disabling the user to select the printing job.

16. The apparatus according to claim 15, wherein, if the information indicating that it is inappropriate to print the image in the printing apparatus is included in the print setting information of the printing job generated by the first generation of the reuse determining section, the format in which the display section displays the printing job on the control panel is gray-out display.

17. The apparatus according to claim 15, wherein
the printing-data delivery apparatus further includes a filter-off function section configured to regenerate, if the printing job generated by the first generation of the reuse determining section has print setting information including information indicating that it is inappropriate to print the image in the printing apparatus, a printing job to neglect the information, and
the display section displays, if the filter-off function section is enabled, even the printing job displayed on the control panel in the format for disabling the user to select the printing job on the control panel such that the user can select the printing job.

18. The apparatus according to claim 17, wherein
if the printing-job determining section determines that the information is included in the print setting information, the printing-job determining section display-outputs any one of printing without a change of print setting of the printing data, printing with a change of the print setting of the printing data, and neglect of the print processing of the printing data to the display section in a format for enabling the user to select the printing or the neglect, and
the display section display the printing job on the control panel on the basis of the display output of the printing-job determining section and requests the user to perform an operation input.

19. The apparatus according to claim 18, wherein
if the printing job request received by operation input to the control panel by the user is a printing job list request for displaying a plurality of the printing job requests in a list format, the reuse determining section further performs second generation for repeatedly applying the determination, and the first generation to all print data of the printing job list request to generate a printing job list in which a plurality of the printing jobs are displayed in a list format, and
the display section displays the printing jobs generated by the second generation of the reuse determining section on the control panel.

20. The apparatus according to claim 18, wherein, if the printing-job determining section determines that the user selects the print with a change of the print setting of the printing data among the displays displayed by the display section on the control panel on the basis of the display output from the printing-job determining section, the printing-job determining section changes setting of a stapling function, a hole punching function, a reverse side paper using function, and a security level in the print setting information of the printing data to be suitable for the printing apparatus.

* * * * *